May 12, 1970     H. L. RATLIFF, JR     3,511,928
WIDE-ANGLE VIEWING DEVICE FOR CHROMATIC-FREE AND
DISTORTION-FREE RE-CREATION
Original Filed April 24, 1963     9 Sheets-Sheet 2

INVENTOR

Harvey L. Ratliff Jr.

FIG. 4

INVENTOR
Harvey L. Ratliff Jr.

INVENTOR
Harvey L. Ratliff Jr.

FIG. 8
FIG. 9
FIG. 10
FIG. 11
FIG. 12

May 12, 1970  H. L. RATLIFF, JR  3,511,928
WIDE-ANGLE VIEWING DEVICE FOR CHROMATIC-FREE AND
DISTORTION-FREE RE-CREATION
Original Filed April 24, 1963  9 Sheets-Sheet 6

INVENTOR
Harvey L. Ratliff Jr.

INVENTOR
Harvey L. Ratliff Jr.

May 12, 1970   H. L. RATLIFF, JR   3,511,928
WIDE-ANGLE VIEWING DEVICE FOR CHROMATIC-FREE AND
DISTORTION-FREE RE-CREATION
Original Filed April 24, 1963   9 Sheets-Sheet 8

FIG. 19

FIG. 20          INVENTOR

Harvey L. Ratliff Jr.

May 12, 1970           H. L. RATLIFF, JR           3,511,928
WIDE-ANGLE VIEWING DEVICE FOR CHROMATIC-FREE AND
DISTORTION-FREE RE-CREATION
Original Filed April 24, 1963           9 Sheets-Sheet 9

INVENTOR
Harvey L. Ratliff Jr.

United States Patent Office 3,511,928
Patented May 12, 1970

3,511,928
WIDE-ANGLE VIEWING DEVICE FOR CHROMATIC-FREE AND DISTORTION-FREE RE-CREATION
Harvey L. Ratliff, Jr., Oxon Hill, Md., assignor to Jetru Inc., Amarillo, Tex.
Original application Apr. 24, 1963, Ser. No. 275,411. Divided and this application Oct. 22, 1965, Ser. No. 500,614
Int. Cl. H04n 9/60
U.S. Cl. 178—6.5    4 Claims

ABSTRACT OF THE DISCLOSURE

Apparatus is devised for electronically introducing a distortion, such as barrel distortion, in the image at the object planes of wide-angle oculars for reversing to eliminate the opposite distortion, such as pincushion distortion, of these wide-angle oculars which are, for example, simple oculars having a simple aspherical lens element therein, and apparatus is devised for introducing a chromatic reversing situation in the image at the object planes of wide-angular oculars such as the said simple wide-angle oculars having a single lens element therein for reversing to eliminate the chromatic aberration introduced by these wide-angle oculars.

---

This is a divisional application of my copending prior application Ser. No. 275,411, filed Apr. 24, 1963, now abandoned.

The present invention relates generally to devices for re-constructing extremely wide-angle stereoscopic portrayals. It is specifically directed to the unique and novel construction of wide-angle viewing device for chromatic-free and distortion-free re-creations.

The system is described as it relates to the monitoring recording device completely described in the patent application Ser. No. 275,411 filed Apr. 24, 1963, now abandoned; however, it could have just as readily been described as it relates to the devices of some of my other inventions.

The prior art offers no system whatsoever for reducing the "chromatic aberration" or "barrel distortion" that may exist either noticeably or not in conjunction with extremely wide-angle stereoscopic portrayal re-creations to thereby increase the quality of the re-creations.

It is the primary object of the present invention to teach a system for accomplishing these two tasks.

Other objects and advantages of my invention will become more apparent from a study of the following description taken with the accompanying drawings wherein.

Figure 1:
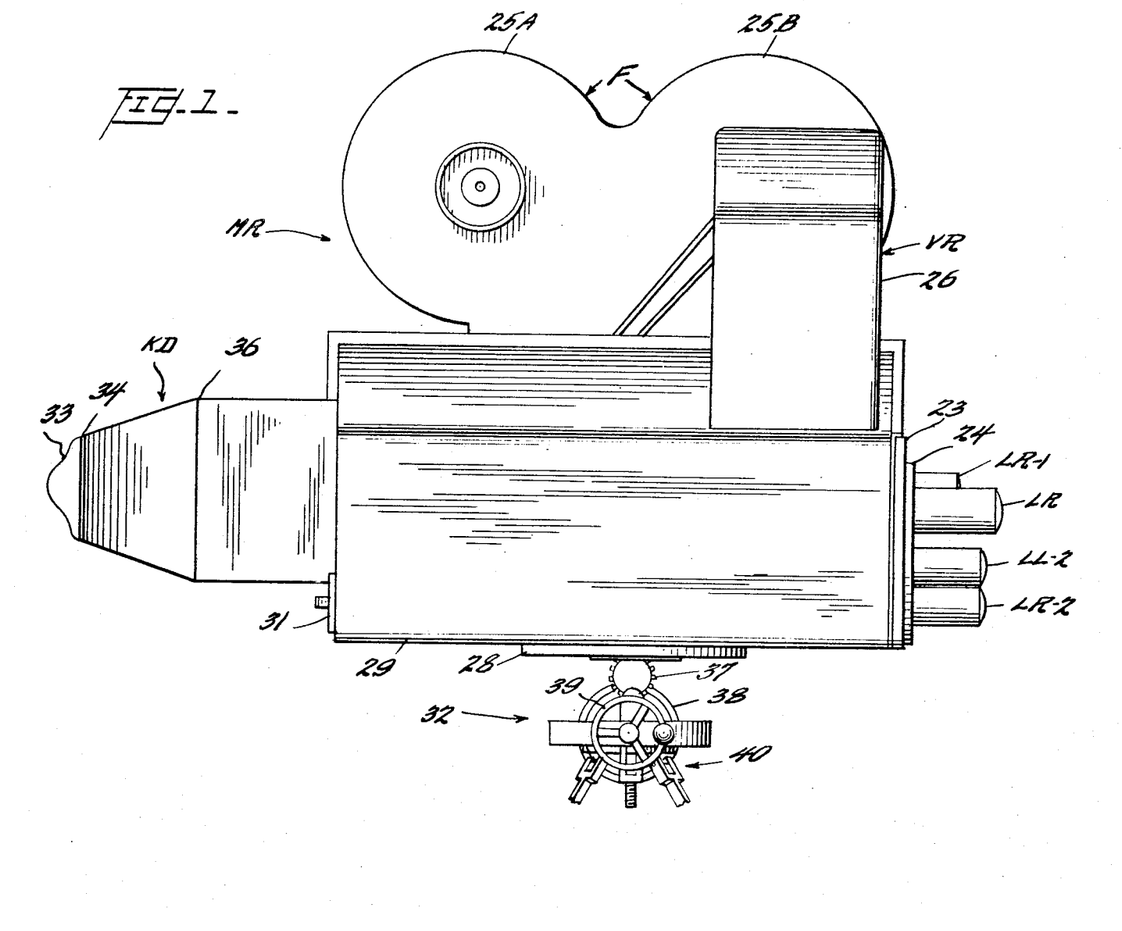
FIG. 1 is a side view of a mechanical-electro-optical unit with which the present invention may be used as a subcombinational part showing the present invention as KD.
Figure 2:
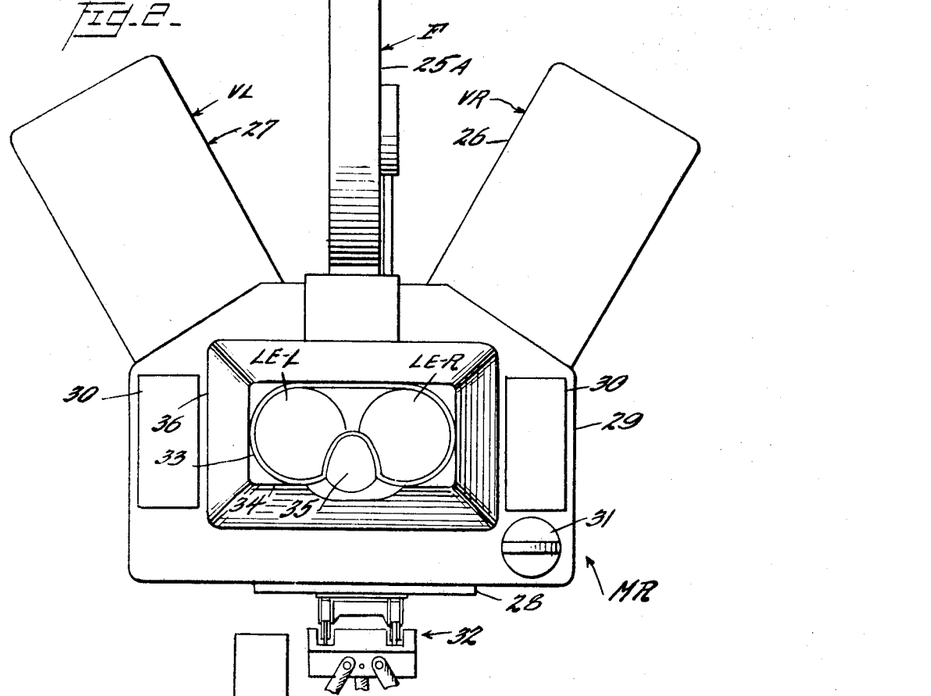
FIG. 2 is a rear view of the combination shown in FIG. 1.
Figure 3:
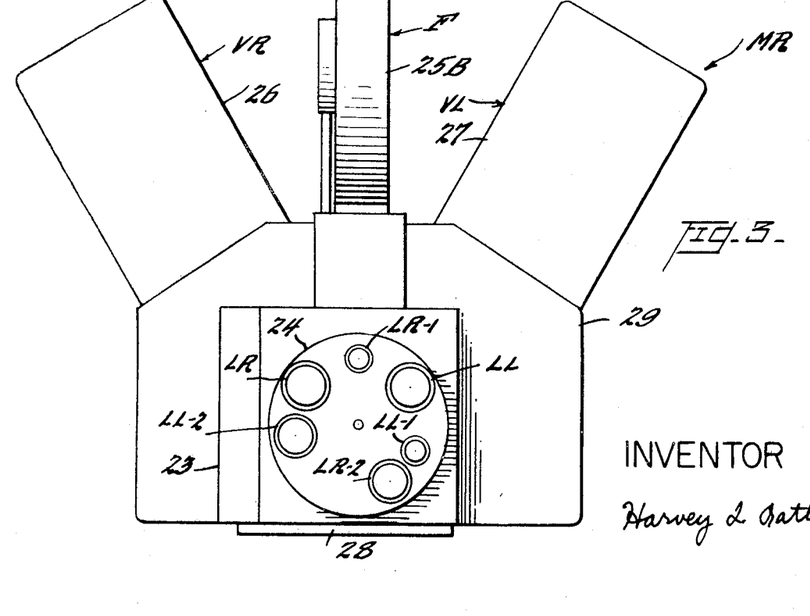
FIG. 3 is a front view of the combination shown in FIG. 1.

Referring more particularly to FIGS. 1–3 which are illustrations of the electro-optical-mechanical device MR of which the present invention may be a subcombinational part. For a detailed description of MR the reader is referred to my said parent application 275,411.

Figure 4:
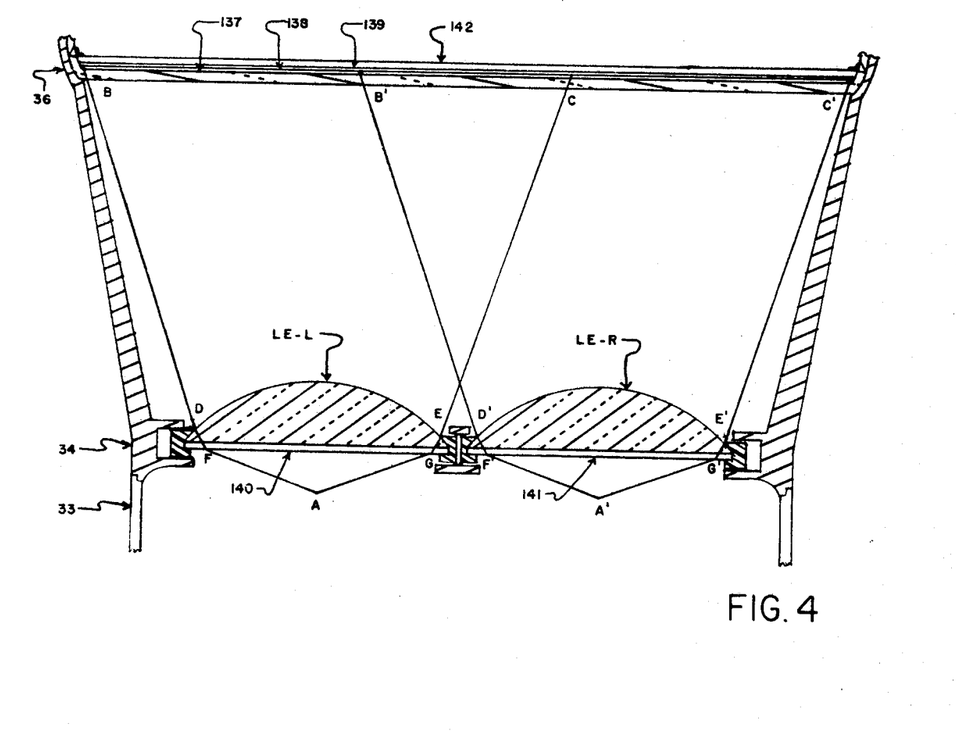
FIG. 4 is a sectional view of the optical portion of the kinescopic optical viewing device KD of FIG. 1 which is part of the present invention.

Reference is now made to FIG. 4. The left and right eyes of the viewing observer are guided to positions A and A' respectively by the nose guide 35 (of FIG. 2) and face guiding eye shield 33 (of FIGS. 1 and 4). At position A said left eye has a wide-angle of view GAF and said right eye has a wide angle of view G'A'F'. In order to form an image of angle GAF an image is formed on phosphorescent or fluorescent layer 139 of screen 36 having peripheral rays emitted which originate at points B and C. A ray originating at C passes from fluorescent layer 139 through optical means 138 (which precludes or helps to preclude rays originating at point C or any left eye view rays from reaching point A') through transparent supporting means 137, to point E on lens LE–L (where it is bent toward point G), through LE–L, through optical element 140, to point G (where it is bent toward A), to point A. By similar ray tracing it is obvious that an image formed having a diameter BC (in the horizontal and vertical plane) would appear to have an angle of view of GAF (in the horizontal and vertical plane). The same obviously applied to the right eye view image having a diameter B'C'.

It is here pointed out that transparent supporting means 137 may be of lead glass or other material (such as that taught by J. G. Schneeman in Pat. No. 2,894,140 issued July 7, 1959) which protects the eyes from X-rays or other harmful radiation. Also the chamber inclosed between lenses LE and supporting means 137 may be made air tight and filled with a radiation absorbing media (such as that taught by Pat. No. 3,045,120 issued to C. H. Ohrn on July 17, 1962) if one wishes to go to extremes in order to eliminate all possible harmful radiation.

It is here pointed out that a design object is that nose guide 35 and face guiding eye shield 33 are such that a person of normal vision while wearing glasses will be comfortable while viewing into KD as well an a person of normal vision without glasses. Further screen 36 and lenses LE–L and LE–R may, of course, be made adjustable by well known methods (for example those taught by M. L. Heilig in Pat. No. 2,955,156 issued Oct. 4, 1960). Of course, there is only one screen in this invention, and only one kinescopic tube; therefore the lateral adjustments of the two tubes and two screens of Heilig would not apply to this invention.

Figure 5:
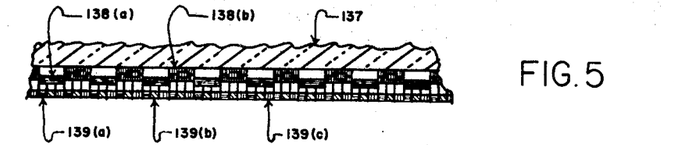
FIG. 5 is a partial sectional enlarged view of a screen used in one contemplated form of the kinescopic optical viewing device of the present invention.
Figure 9:
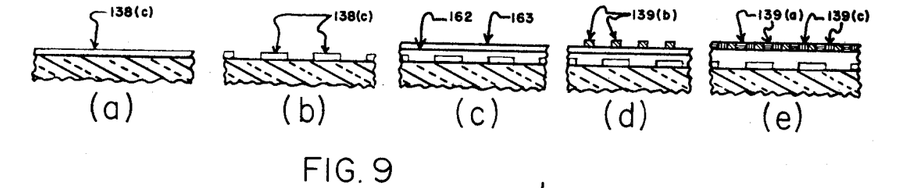
FIG. 9 shows partial sectional enlarged view designed to illustrate the steps taken in making the screen of FIG. 9(e).

At this point screen 36 will be described in detail. First optical means 138 will be described in detail. It may be of form 138(a) and 138(b) of FIG. 5 working in conjunction with 140 and 141 of FIG. 4. Also it may be of the form 138(c) shown in FIG. 9(b). Elements 138(a) and 138(b) are light polarizing elements having their axis of polarization rotated 90 degrees from each other. Filters 140 and 141 are also polarizing. Filter 140 has an axis of polarization substantially identical to that of elements 138(a). Filter 141 has an axis of polarization which is rotated 90 degrees from that of 140 and which is substantially identical to those of elements 138(b). How elements 138(c) function is explained in FIG. 14 of my co-pending application 250,562, filed Jan. 10, 1963.

Only as by way of example, if screen 36 is to be consistent with the example given in the parent case 275,411, of targets 7L and 7R the following must be true: If the scan lines are horizontal, there must be a total of 16,000 scan lines (8,000 for each eye). It is understood, of course, that under some of the parameters of this invention the scanning must be vertical for the invention to work. If the scan lines are vertical, there must be 8,000 scan lines for each eye, but the center of each of these 8,000 scan lines for each eye is displaced the interpupillary distance of $2\%_{16}''$; so if KD is designed such that screen 36 will be 7 inches wide, each of the 8,000 scan lines must have a combined width of $$(7-2\%_{16}'')(2)/2=4\%_{16}''$$

Therefore there would be: $8,000/4\%_{16}=1805$ scan lines per inch for each eye and 3610 scan lines per inch. Therefore, for the above design there would be 25,270 total vertical scan lines on a 7" screen, when the tube of FIG. 25 is used. Obviously, part of these 25,270 vertical scan lines would have no velocity modulation; thereby producing no image on screen 36. Only 16,000 of these scan lines are effective in producing an image.

Figure 6:
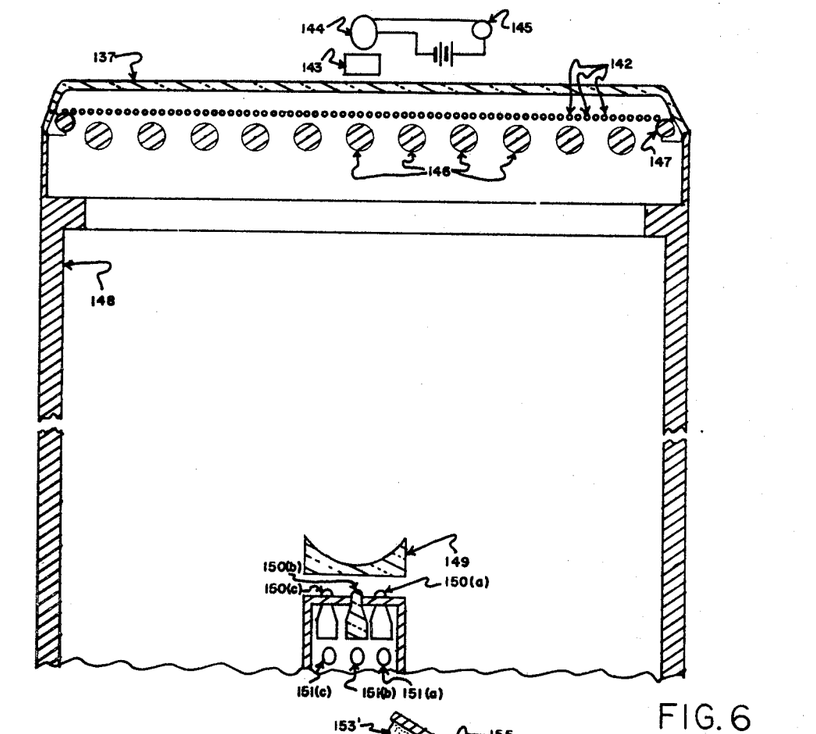
FIG. 6 is a partial sectional view of the apparatus used to make the screen of FIG. 5 and FIG. 9(e).
Figure 7:
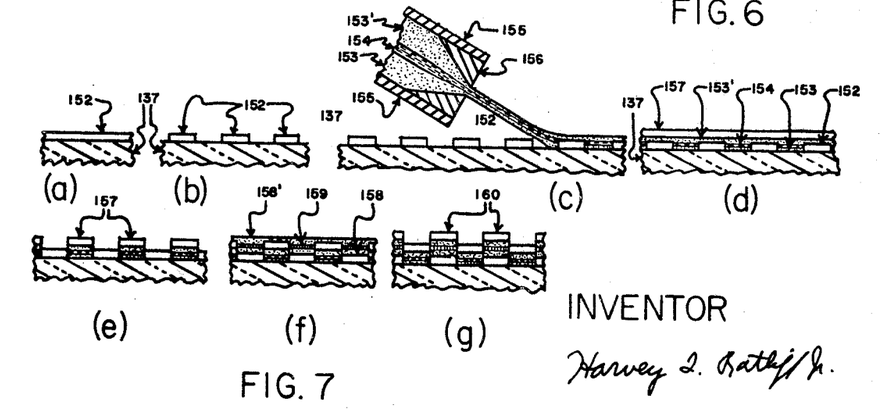
FIGS. 7 and 8 are partial sectional enlarged views designed to illustrate the steps taken in the screen of FIG. 5.

At this point a contemplated method of making both basic forms of screen 36 will be set forth in detail. First the form of FIGS. 7 and 8 will be described. By way of example it will be assumed that a 7" x $4\%_{16}''$ screen designed for horizontal scanning is desired. Since consistency with previous examples requires screen 36 to have 3,610 scan lines per inch, there must be 10,830 fluorescent elements 139 (3,610 of 139(a), 3,610 of 139(b), and 3,610 of 139(c)) per inch. Wires 142, see FIG. 6, having a diameter of about 0.0001844 inch are wound around masking frame 147 by use of the device of FIG. 12 of the parent case or any well known method. Frame 147 having been grooved with 3,610 grooves per inch in the manner described above. Therefore wires 142 are spaced apart about 0.0000922 inch. Light rods or transmitters 150(a), 150(b), and 150(c) are placed in identically the same positions which will be occupied by the blue gun, green gun, and red gun respectively at a later date. Refracting means 149, which may be three separate diverging lenses, is designed to provide a means of correcting for the position of the screen by having refracting characteristics substantially equivalent to the deflection characteristic of the electron lens used later in the tube. However, it is not necessary to have refracting means 149, any well known method of obtaining exposures of high resolution may be used. Wires 146 are wound around a frame (which is not shown) by the device of FIG. 12 of the parent case, 275,411 or the like. Said frame has been grooved with 1,805 grooves per inch in the manner described above. Wires 146 have a diameter of about 0.000276 inch and are therefore spaced apart about 0.000276 inch. Said frame for wires 146 is made precisely adjustable by a micrometer screw arrangement such as the one described above. At this point work piece 137 is rigidly held by frame 148 in any well known manner. Light rod 150(a) is illuminated by cylindrical lamp 151(a). Mask 146 is moved to the left until full illumination as measured by microammeter 145 reading current from phototube 144 (which works in conjunction with collimator 143). At this point mask 146 is moved back to the left, which causes an immediate drop in the reading of 145. Now mask 146 is cautiously moved back to the left by the worm gear arrangement described in the parent case, 275,411 and stopped at the instant full illumination is indicated by microammeter 145. Masking support 147 is rigidly attached to work piece 137 in any well known manner. The internal surface of work piece 137 is coated with a substantially transparent radiant energy sensitive substance 152 of FIG. 7(a) such as the light sensitive material polyvinyl alcohol sensitized with ammonium dichromate. This coating may be applied by flowing, spraying, or other similar fluid depositing methods. At this point work piece 137 is rigidly held by frame 148 in any well known manner within a tolerance much less than the distance between light rods 150(a), (b), and (c). Now coating 152 is exposed to the light from all three light rods 159(a), 150(b), and 150(c) illuminated by cylindrical lamps 151(a), 151(b), and 151(c) respectively. The exposed areas become hardened and adhere to work piece 137. Next a developing fluid such as deionized water is applied to the work piece to remove the unhardened areas and to produce a series of bars or strips approximately 0.0002766 inch wide as shown in FIG. 7(b). At this point a radiant energy sensitive layer 153 having no crystals and being substantially transparent such as polyvinyl alcohol sensitized with ammonium dichromate is placed in a chamber formed by walls 155 and wedging elements 156 in any suitable fashion. Next to the layer 153 as shown in FIG. 7(c) is placed a layer 154, preferably relatively thin, of material containing ultramicroscopic polarizing crystals (such as herapathite). Next to this layer and above it is placed a third layer 153' of the same substance as layer 153. An opening between wedging elements 156 has dimensions substantially similar to a cross-section of layer 154 behind the wedging elements) and is located adjacent to that layer. Means are provided for extruding the material through said opening. In this manner layer 154 is subjected only to the forces of stretch and not to the forces of shear, so that the said ultramicroscopic polarizing crystals are aligned substantially parallel. Therefore, layer 154 becomes dichroic. It is understood of course that only "beta" type crystals are used or that only "alpha" type, but not both types for the well known reasons. By way of example layer 154 is extruded perpendicular to strips 152 as shown in FIG. 7(c).

An extra layer of radiant energy sensitive material 157 may or may not be put on as is desired (see FIG. 7(d)). At this point work piece 137 is placed back on frame 148 within the above stated tolerance limits. Now wires 146 are moved either to the left or the right 0.0002766 inch by said micrometer screw. Now conjugately and alternately related strips approximately 0.0002766 inch wide are now exposed (by all three light rods) and developed as shown by FIG. 7(e).

At this point another polarizing layer 159 is extruded as described above, with the following exception: Layer 159 is extruded parallel to said strips 152, not perpendicular as shown in FIG. 7(c). Layer 158 and 158' would be the lower and upper light sensitive sandwiching layers. Therefore, obviously, the axis of polarization of strips 159 is rotated 90 degrees from the axis of polarization of strips 154. Also extra radiant energy sensitive layer 160 may or may not be placed upon layer 158'.

Figure 8:
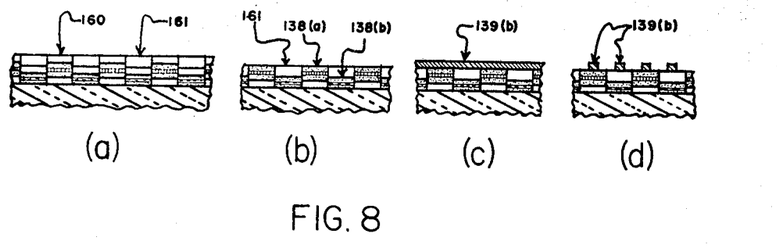

Now work piece 137 is placed rigidly upon frame 148 as above, and wires 146 are moved about 0.0002766 inch in either direction. The conjugately and alternately related polarizing strips 159 are exposed and developed as shown in FIG. 7(g). Now another coating of radiant energy sensitive material 161 is sprayed or placed upon the work piece and exposed and developed in the above described manner resulting in FIG. 8(a) if layers 157 and 160 are desired and in FIG. 8(b) if layers 157 and 160 are not desired. Obviously 138(a) consists of 158', 159, and 158; and 138(b) consists of 153', 154, and 153.

Figure 12:
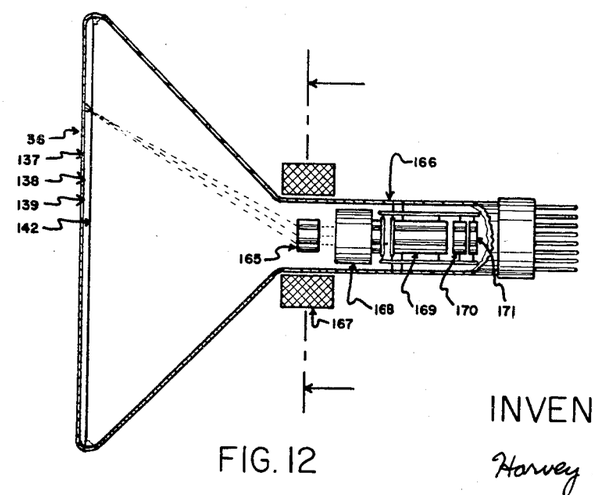
FIG. 12 is a sectional view of one contemplated form of a cathode ray tube used in the present invention.

At this point mask 146 is removed. A slurry 139(b) of green phosphor material such as zinc orthosilicate and a suitable radiant energy sensitive material is sprayed or otherwise placed upon work piece 137 as shown in FIG. 8(c). Now work piece 137 is rigidly placed upon frame 148 as above and green light rod radiating white light 150(b) illuminated by 151(b) exposes only the areas the green gun of FIG. 12 is to make fluoresce later. Now these areas are developed by the application of any desirable developing fluid such as deionized water to remove the unhardened areas, as above, resulting in the configuration shown in FIG. 8(d). In similar manner red phosphor 139(c) and blue phosphor 139(a) being for example zinc phosphate and zinc sulfide respectively, each sensitized with a suitable radiant energy sensitive material, are exposed by light rods 150(c) and 150(a) respectively and developed as above.

Now the form of FIG. 9 will be described. In most situations this form requires that the scanning is vertical; therefore by way of example vertical scanning will be assumed and the same number of scan lines per inch will be assumed. Therefore the diameters of wires 142 and wires 146 are the same as before. However, there would obviously be more and each would be shorter. In other respects the apparatus of FIG. 6 is the same as before. Now some opaque radiant energy sensitive material 138(c) (such as polyvinyl alcohol having randomly dispersed herapathite crystals within it and being sensitized with ammonium dichromate) is flowed or otherwise placed upon work piece 137 as shown in FIG. 9(a). Now mask 146 is oriented as described above such that a viewing observer later can see only the right eye view blue, green, and red phosphor elements (139(a), 139(b), and 139(c)) with his right eye and the left eye view blue, green and red phosphor elements with his left eye. At this point the proper areas are exposed by all three light rods and developed as above to result in FIG. 9(b). Now as many layers 162 and 163 of transparent radiant energy sensitive material may be applied and developed as required for proper function shown in FIG. 14 of my above cited co-pending application 250,562 and shown in FIG. 9(c) for example. Green, red, and blue phosphors are placed upon layer 163 in the manner described above resulting in FIGS. 9(d) and 9(e).

Figure 10:
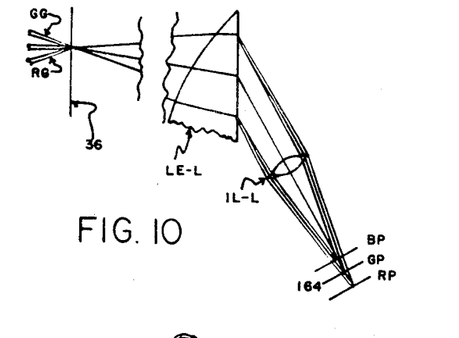
FIGS. 10 and 11 are broken sectional views of the optical portion of the kinescopic optical viewing device of the invention and are designed to illustrate some concepts involved in correcting for chromatic aberration.

In extremely wide angle stereoscopic kinescopic optical viewing devices such as the one of this invention, chromatic aberration is, of course, a problem. A method of correcting for chromatic aberration is, therefore, obviously desirable. In KD of FIG. 1, the optical effect of chromatic aberration upon a viewing observer may be explained by reference to FIG. 10. As far as the eye of a viewing observer is concerned green gun beam GG, blue gun beam BG, and red gun beam RG all converge on a single spot upon screen 36. Therefore, in explaining FIGS. 10–15, that said beams do converge at one spot upon screen 36 can be assumed. Green rays, blue rays, and red rays leave this spot to pass through lens LE–L (or of course LE–R). At LE–L the rays are bent as shown. The blue rays are bent the most, the green rays are bent next to the most, and the red rays are bent the least so that when these rays pass the lens 1L–L of the left eye of the viewing observer, they cannot all three focus on the retina 164 of his eye. These rays focus on three different planes BP, GP, and RP as shown. If the eye focuses the green rays on the retina 164, the plane of focus of the blue rays BP will be in front, and the plane of focus of the red rays RP will be to the rear of retina 164. The axis of lens LE–L and the left eye view of screen 36 will now be defined as a line passing through the center of lens LE–L and the center of the left eye view on screen 36. It is here pointed out, of course, that near said axis, there will be only negligible chromatic aberration. As the spots from which light rays originate upon screen 36 are displaced in any perpendicular direction from said axis, chromatic aberration increases. In other words the amount of chromatic aberration is a direct function of the displacement distance between the gun convergence spot and the center of the left eye view on screen 36 (in the case of the left eye for example).

Figure 11:
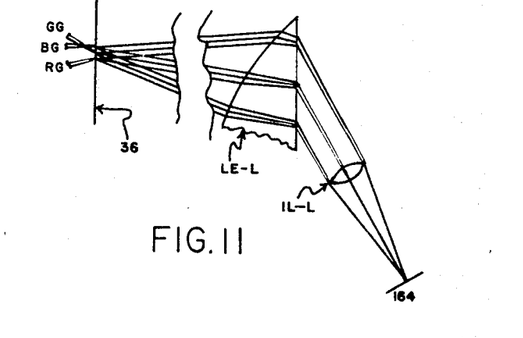

One way to correct for chromatic aberration may be explained by reference to FIG. 11. If it is possible to cause the beam from the blue gun to strike said screen 36 at a spot slightly further from said axis than the beam from the green gun does, and to cause the beam from the green gun to strike said screen 36 at a spot slightly further from said axis than the beam from the red gun does in a controlled manner, chromatic aberration could be corrected for as shown in FIG. 11. All the time this is going on, mask 142 allows the beam from the blue gun to strike only the blue phosphor elements 139(a) of FIGS. 5 and 9, the beam from the green gun to strike only the green phosphor elements 139(b) of FIGS. 5 and 9, and the beam from the red gun to strike only the red phosphor elements 139(c) and of course elements 138 of FIGS. 5, 7, 8, and 9 make it impossible for the incorrect rays to reach either eye of the viewing observer. Blue light rays leaving the phosphor element energized by the blue gun beam are bent the most as shown in FIG. 11, but since they originate at a point further from said axis than the green light rays leaving the phosphor element energized by the green gun beam, lens LE–L bends the blue rays enough more that lens 1L–L of the viewing observer's eye may focus them both on his retina 164 at the same instant. With the situation as shown in FIG. 11 obvious reasoning shows that said lens 1L–L can focus the blue, green, and red light rays, all on said retina 164 at the same time. Therefore a means must be devised which will cause said three beams to converge as they normally would at said axis (the center of the right eye view on screen 36), but which will cause displacement between said beams at the same instant upon screen 36 when they are away from said axis in any direction. Said displacement between said beams would be a direct function of the distance said beams strike screen 36 from said axis.

Figures 13, 14, 15, 16:
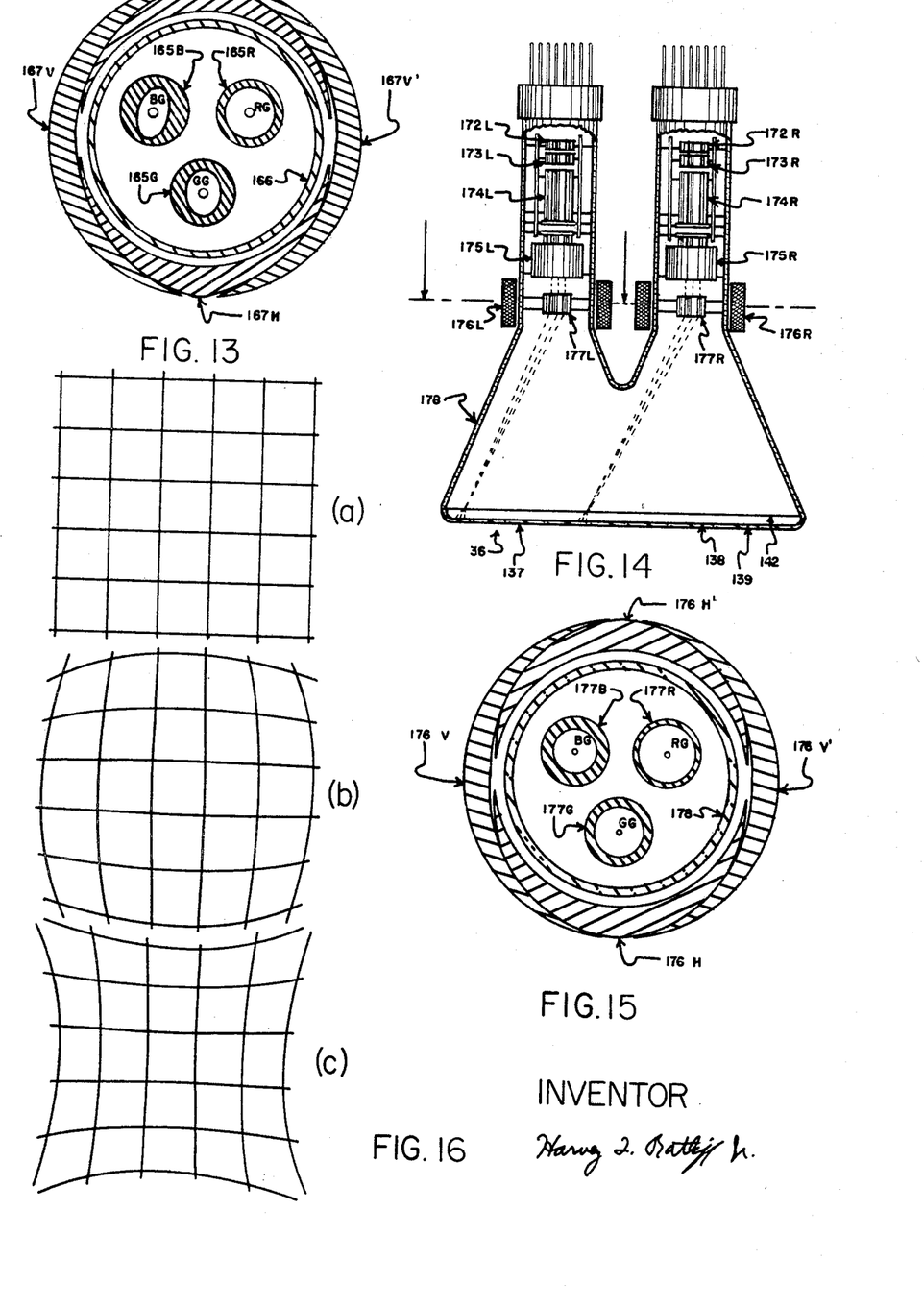
FIG. 13 is a sectional view taken along line 26—26 of FIG. 12 in the direction of the arrows.
FIG. 14 is a sectional view of another contemplated form of a cathode ray tube used in the present invention.
FIG. 15 is a sectional view taken along line 28—28 of FIG. 14 in the direction of the arrows.
FIG. 16 is designed to illustrate some concepts involved in correction for distortion.

It is well known that certain metals such as iron have a greater magnetic permeability than air, and that there are ways to increase or decrease the magnetic permeability in a given area by the use of such metals. A contemplated method of correcting for chromatic aberration may now be explained by reference to FIGS. 14 and 15. Tube 178 consists of an evacuated envelope containing two sets of three guns. Each gun, of course, consists of a heater, a cathode, a control grid (172L and 172R), an accelerating (or screen) grid (173L and 173R), a focusing electrode (174L and 174R), and a converging electrode (175L and 175R) as shown in FIG. 14. Placed just in front of said electrodes 175L and 175R toward screen 36 are two deflection yokes 176L and 176R. In the center of each deflection yoke is placed a chromatic aberration correcting element 177L and 177R respectively. Elements 177L and 177R correct for chromatic aberration by placing the greatest amount of magnetic permeability around the blue gun beam BG (of FIG. 15), the next greatest amount of magnetic permeability around the green gun beam GG, and the least amount of magnetic permiability around the red gun RG. This magnetic permeability is regulated such as to obtain the most desirable correction for chromatic aberration. One way of doing this is to place magnetically permeable metal cylinders symmetrically around the central path of BG, GG, and RG with the thickness greatest around BG, next to the greatest around GG, and least around RG as shown in FIG. 15.

It is obvious that difficulties would arise when trying to use this principle in tube 166 of FIGS. 12 and 13 in the plane of horizontal deflection. However, the chromatic aberration may be corrected in the plane of vertical deflection by varying magnetic permeability effected by only the vertical deflection coils 167V' and 167V as shown in FIG. 13 by 165B, 165G, and 165R as shown.

Depending upon the type of wide angle lenses (LR and LL of FIGS. 1–3) used and the type of viewing lenses (LE–L and LE–R of FIGS. 2 and 4) used, either pincushion distortion or barrel distortion may or may not be a problem. In order to make clear that applicant is referring to the well known concept of barrel distortion and pincushion distortion, reference is made to FIG. 16. FIG. 16(a) shows a view which has no distortion; FIG. 16(b) shows a view which has barrel distortion; and FIG. 16(c) shows a view which has pincushion distortion. If the combination of lenses LR, LL, LE–L, and LE–R produce the effect of barrel distortion for each eye of the viewing observer, it would be desirable to produce pincushion distortion electronically to a sufficient degree to cause the viewing observer to see no distortion. Of course pincushion distortion would need to be electronically corrected in the obvious opposite manner.

Figure 18:
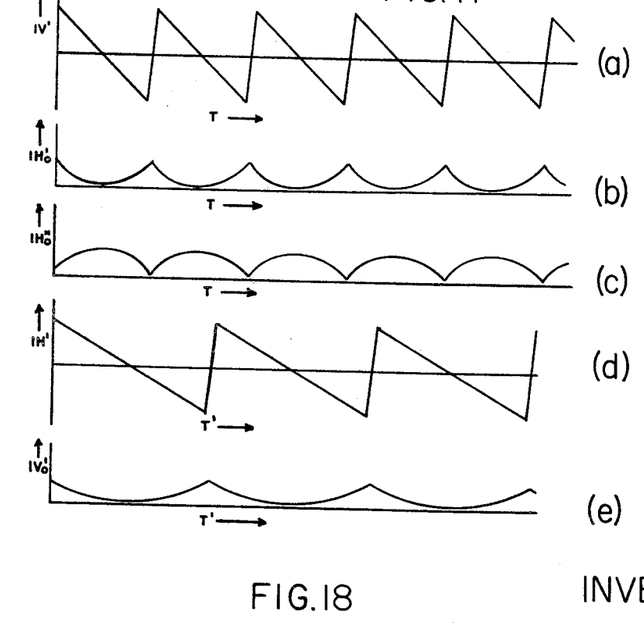

It is well known that curvilinear current impulses such as those shown in FIG. 18(b) may be developed and synchronized with a well known saw tooth scanning current impulse such as that shown in FIG. 18(a).

Figure 17:
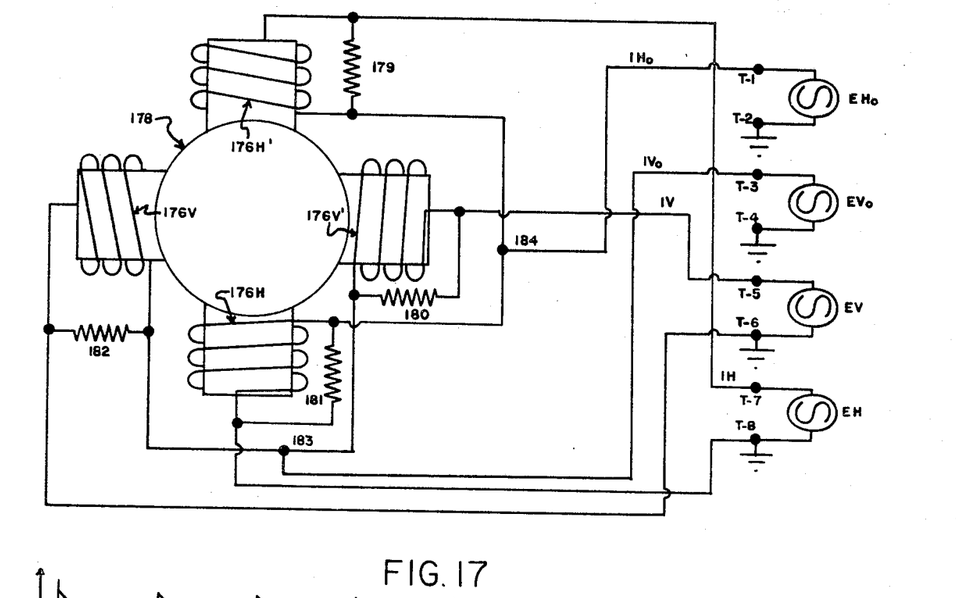
FIGS. 17–19 diagrammatically illustrate some of the electronic and magnetic functions of the invention.

Reference is now made to FIG. 17. A signal voltage $EH_0$ is developed and synchronized with EV in a well known manner and placed across terminals T–1 and T–2. Also a signal voltage $EV_0$ is developed and synchronized with EH and placed across terminals T–3 and T–4. A form of the well known vertical electromagnetic-deflection voltage EV is placed across terminals T–5 and T–6, and a form of the well known horizontal electromagnetic-deflection voltage EH is placed across terminals T–7 and T–8. If voltages $EH_0$ and $EV_0$ were disconnected from the circuit of FIG. 17, voltages EV and EH would generate currents 1V' and 1H' respectively of FIGS. 18(a) and 18(d) respectively rather than currents 1V and 1H respectively of FIG. 17. By way of example the frequency of EH and of course 1H' is 30 cycles per second (in order to hold down the well known "flicker"). In order to be consistent with the parameters described above, we will say that there must be 8,000 vertical scans per horizontal scan. Therefore the frequency of EV and of course 1V' is 240,000 cycles per second. Therefore, obviously the time scale for curves (a), (b), and (c) of FIG. 18 indicated by T is different than the time scale for curves (d) and (e) of FIG. 18 indicated by T'. Of course EV and EH would be synchronized in a well known manner. If voltages EH and EV were disconnected from the circuit of FIG. 17, voltages $EH_0$ would generate current $1H_0'$ or its reciprocal $1H_0'$ of FIGS. 18(b) and 18(c) respectively which ever is desirable. Also voltage $EV_0$ would generate currents $1V_0'$ (of FIG. 18(e)) or its reciprocal (not shown) whichever is desirable.

Electromagnetic-deflection coils 176H, 176H', 176V, and 176V' of FIG. 15 (being of any desirable well known type) are shown schematically in FIG. 17. Coils 176H', 176V', 176H, and 176V are shunted by resistors 179, 180, 181, and 182 respectively in order to damp quickly any oscillation that might be set up because of the distributed capacitance inherent in deflection coils (for more information about the high resolution picture tube, the reader is referred to SN 624,638, which is a continuation of my SN 505,118, which was a copending divisional application of said parent case SN 275,411.

The signal placed across T–5 and T–6 is traceable from T–5 through coil 176V' which is shunted by resistor 180, through coil 176V which is shunted by resistor 182, to T–6 which is grounded, through the transformer coil of signal source EV (not shown), and back to T–5.

The signal placed across T–7 and T–8 is traceable from T–7 through coil 176H', which is shunted by resistor 179, through coil 176H which is shunted by resistor 181, to T–8 which is grounded, through the transformer coil of signal source EH (not shown), and back to T–7.

The signal placed across T–1 and T–2 is traceable from T–1 to terminal 184. At terminal 184 said signal goes two paths at the same instant (therefore the $EH_0$ of 176H is the reverse of the $EH_0$ of 176H'). The first path is from terminal 184 through coil 176H' which is shunted by 179, to terminal T–7, through the transformer coil described above, through ground, to T–2, through signal source $EH_0$ and back to T–1. The second path is from terminal 184 through coil 176H which is shunted by 181, to T–8, through ground, to T–2, through signal source $EH_0$ and back to T–1.

The signal placed across T–3 and T–4 is traceable from T–3 to terminal 183. At terminal 183 said signal goes two paths at the same instant. The first path is from 183 through coil 176V' which is shunted by resistor 180, to terminal T–5 through the transformer coil of EV (not shown), to terminal T–6, through ground, to terminal T–4, through signal source $EV_0$ and back to T–3. The second path is from 183 through coil 176V which is shunted by resistor 182, to terminal T–6, through ground to T–4 through signal source $EV_0$ and back to T–3.

Now reference is made to FIGS. 15 and 17. Since the force on traveling electrons in a magnetic field is at right angles to both the direction of motion and the lines of the field, coils 176V and 176V' deflect the electron beams BG, GG, and RG in vertical planes and coils 176H and 176H' deflect the electron beams BG, GG, and RG in horizontal planes.

Because of the circuitry set forth above, the current developed by EH causes the magnetic flux lines produced by coil 176H' to force beams BG, GG, and RG to the right when, at the same instant, the magnetic flux lines produced by coil 176H are forcing beams BG, GG, and RG to the right. Also this current causes the magnetic flux lines produced by coil 176H' to force beams BG, GG, and RG to the left when at the same instant the magnetic flux lines produced by coil 176H is forcing beams BG, GG, and RG to the left. Therefore the current developed by EH causes horizontal scanning in the well known sawtooth manner. For analogous reasons the current developed by EV causes vertical scanning in the well known sawtooth manner.

However, the current developed by $EH_0$ causes the magnetic flux line produced by coil 176H' to force beams BG, GG, and RG to the *right* when at the *same instant* the magnetic flux lines produced by coil 176H is forcing beams BG, GG, and RG to the *left*. When the flux lines surrounding beams BG, GG, and RG produced by coil 176H are exactly as strong as the flux lines surrounding beams BG, GG, and RG produced by 176H', the resultant force is of course zero (0) and the current developed by $EH_0$ has no effect. However, when the flux lines surrounding any one or all of said beams and produced by one coil are stronger than those surrounding any one or all of said beams and produced by the other coil, the current developed by $EH_0$ obviously has a definite effect. Since beam BG in its neutral position is closer to coils 176H' and 176V' than 176H and 176V, the magnetic permeability to the right of and below BG should be made greater than that to the left of and above BG (for example by placing more magnetically permeable metal to the right of and below BG). In a similar manner the magnetic permeability surrounding GG and RG should be altered such that when the three beams converge at a spot on screen 36 and also the axis of the center of either the right eye view or left eye view described above, the current developed by either $EH_0$ or $EV_0$ has *no effect* on beams BG, GG, or RG.

In this situation, the current developed by $EH_0$ has its greatest effect when beams RG, GG, and RG are the closest to either 176H' or 176H viz., from elementary physics the beam is obviously influenced much more by the $EH_0$ signal from 176H' than the reverse $EH_0$ signal from 176H when it is closest to 176H', much more by the reverse $EH_0$ signal from 176H than the $EH_0$ signal from 176H' when it is closest to 176H, and equally as much from 176H' as from 176H when it is in the neutral position whereat the $EH_0$ of 176H' cancels the reverse $EH_0$ of 176H, the reversing of $EH_0$ being the result of the connection of T-1 to 184 etc. described hereinabove which causes the flux lines from 176H' to always oppose the flux lines from 176H making the resultant field the difference therebetween which difference varies considerably between 176H' and 176H whereas the connection of T-7 etc. described hereinabove causes the flux lines from 176H' to always reinforce those from 176H to make a substantially constant field between 176H' and 176H. Likewise, the current developed by $EV_0$ has its greatest effect when beams BG, GG, and RG are closest to either 176V' or 176V. Therefore, depending upon whether the current developed by $EH_0$ takes the form $1H_0'$ of FIG. 18(b) or its reciprocal $1H_0''$ of FIG. 18(c) and whether the current developed by $EV_0$ takes the form $1V_0'$ of FIG. 18(e) or its reciprocal, either pincushion or barrel distortion may be corrected by $EH_0$ and $EV_0$ applied in the above described manner viz., the beam traces would not be straight except in the neutral position where $EH_0$ of 176H' cancels the reverse $EH_0$ of 176H or $EV_0$ of 176V' cancels the reverse $EV_0$ of 176V with the traces introducing barrel distortion to correct pincushion distortion when $1H_0'$ and $1V_0'$ of FIGS. 18(b) and 18(e) are applied or introducing pincushion distortion to correct barrel distortion when $1H_0''$ and the reciprocal of $1V_0'$ of FIGS. 18(c) and 18(c) are applied.

Since the manufacture of metal elements which cause precisely the magnetic permeability for use in the above described methods of correcting for chromatic aberration, pincushion distortion, and barrel distortion is expensive, it is desirable to devise a method of correcting these difficulties which will not require precise manufacturing. A device for doing this is schematically illustrated in FIG. 19.

Signal source EV is connected across terminals 185 and 189 in such manner as to develop a much weaker signal across potentiometers 205 and 206 than it does across terminals T-5 and T-6 (of FIG. 17). This of course allows the signal across terminals 186 and 187 and the signal across terminals 188 and 189 to be varied. Terminals 186 and 187 are connected across coil 177V as shown. Likewise terminals 188 and 189 are connected across coil 177V'. By way of example these connections are made such that the magnetic flux lines created by 177V and 177V' are in the same direction at any instant as the corresponding flux lines created by 176V and 176V' respectively. Of course this means that current developed by EV would be running the *same* direction at any corresponding point of both coil 177V and 177V' at the same instant of time. Of course the number of loops in coils 177V and 177V' would be much less than the number of loops in coils 176V and 176V'. In a similar manner signal source EH is placed across series potentiometers 207 and 208 at terminals 190 and 194. Also potentiometer terminals 191 and 192 are connected across coil 177H' and potentiometer terminals 193 and 194 are connected across coil 177H. To be consistent with the example set forth above, these connections are made such that the magnetic flux lines created by 177H' and 177H are in the same direction at any instant as the corresponding flux lines created by 176H' and 176H respectively. This, of course, also means that current developed by EH would be running the *same* direction at any corresponding point of both coils 177H' and 177H at the same instant of time. The number of loops in coils 177H' and 177H would also be correspondingly less than those in 176H' and 176. The type of current developed by the voltage across potentiometers 205 and 206 would of course be of the form shown in FIG. 18(a) as nearly as possible and the type of current developed across potentiometers 207 and 208 would of course be of the form shown in FIG. 18(d) as nearly as possible.

Signal source $EV_0$ is connected across the terminals 204 and 200 in such a manner as to develop a much weaker signal voltage across potentiometers 211 and 212 than it does across terminals T-3 and T-4 (of FIG. 17). Terminals 203 and 204 are connected across coil 177V and terminals 201 and 202 are connected across coil 177V'. To be consistent with the example set forth above, these connections are made such that the magnetic flux lines created by 177V and 177V' are in the same direction at any instant as the corresponding flux lines created by 176V and 176V' respectively. This, of course, means that current developed by $EV_0$ would be running the *opposite* direction at any corresponding point of both coils 177V and 177V' at the same instant of time. Likewise signal source $EH_0$ is connected across terminals 196 and 197 in such manner as to develop a much weaker signal voltage across potentiometers 209 and 210 than it does across terminals T-1 and T-2 (of FIG. 17). Terminals 195 and 197 are connected across coil 177H' and terminals 198 and 199 are connected across coil 177H. To be consistent with the example set forth above, these connections are made such that the magnetic flux lines created by 177H' and 177H are in the same direction at any instant as the corresponding flux lines created by 176H' and 176H respectively. This also means that current developed by $EH_0$ would be running the *opposite* direction at any corresponding point of both coils 177H' and 177H at the same instant of time.

Figure 19:
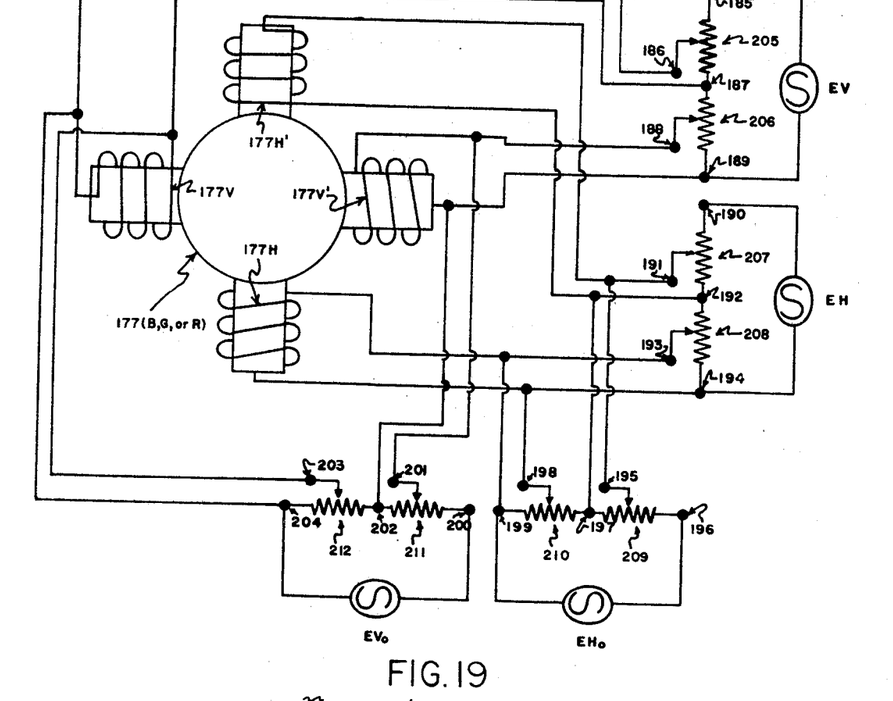

Obviously to correct for chromatic aberration each of the six potentiometers that would be required in the device of FIG. 14 corresponding to 205 of FIG. 19 and each of the six corresponding to 206 of FIG. 19 would be set to give BG (of FIG. 15) the greatest amplitude (more than GG) and RG (of FIG. 15) the least amplitude (less than GG). These amplitudes would of course be such as to give the most desirable correction for chromatic aberration. Likewise each of the six potentiometers corresponding to 207 of FIG. 19 and each of the six corresponding to 208 of FIG. 19 would be set to give BG (of FIG. 15) the greatest amplitude and RG the least amplitude so as to give the most desirable correction for chromatic aberration.

Also each of the six potentiometers corresponding to 209 are set to correct for the fact that BG, GG, and RG, are not at the same distance from coils 176V, 176V', 176H, and 176H at any same instant of time, as are the six potentiometers corresponding to 210, the six corresponding to 211, and the six corresponding to 212.

As a result of the above set forth electronic arrangement, correcting elements 177 (of FIG. 14) do not have to be as precisely manufactured. It is here pointed out that when these various corrections exist mask 142 still allows BG, GG, RG to strike only the phosphorescent elements 139 that they are each supposed to strike (BG strikes only 139(a), GG strikes only 139(b), and RG strikes only 139(c)). Also mask 142 allows the beams from the right eye gun to strike only the elements the right eye sees and beams from the left eye gun to strike only the elements the left eye sees.

Figure 20:
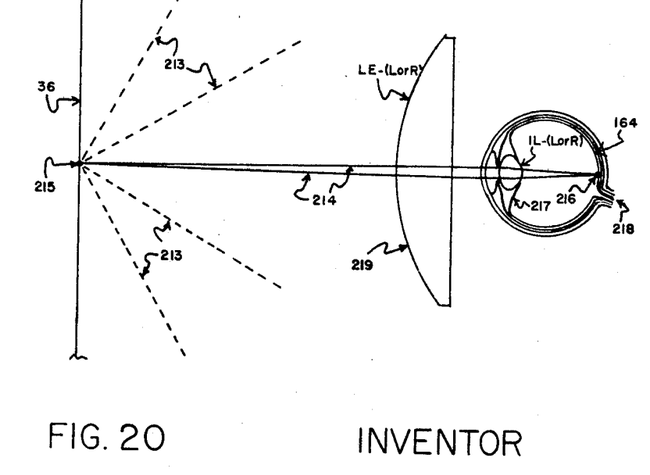
FIGS. 20–24 diagrammatically illustrate some of the optical functions of some contemplated forms of the invention.

In the kinescopic optical viewing device of the present invention a means has been set forth to correct for chromatic aberration; a means has been set forth to correct for pin-cushion distortion; and a means has been set forth to correct for barrel distortion; but nothing has been set forth about the other four monochromatic aberrations. Reference is now made to FIG. 20. Of all the infinite number of light rays 213 which emanate from a point 215 on screen 36, only those within peripheral rays 214 pass through iris 217 to be focused by lens 1L-L or 1L-R upon retina 164 of either of the viewing observer's eyes. Therefore, ($h$) as defined by *Jenkins and White*

(cited above) is very small (of the order of 0.05 inch). For this reason the aberrations caused by coma and spherical aberration are beneath the resolving power of the eye. Also since ($h$) is very small, $\phi$ (phi) as defined by pages 40 and 149 of *Jenkins and White* (cited above) is correspondingly very small. The contemplate lenses LE–L and LE–R of the present invention will therefore, also have astigmatic aberration which is *beneath the resolving power of the eye*. Calculations to provide this are considered unnecessary because any expert in the art can make the necessary calculations.

Two plano-convex lenses which have a focal length of 79 millimeters and a diameter of 60 millimeters (of the type presently sold by Edmund Scientific Co., Catalog 631) will work fine for a screen which is 7" by 4.5" placed parallel to and $2^{13}/_{16}$ inches from the outer flat portion of each lens, and there are of course other lenses that will work fine. However, the lens contemplated by applicant designed to correct for what applicant will call curvature of field will now be explained. In the contemplated form of lens LE-(L or R) surface 219 (see FIGS. 20 and 21) is aspherical.

Figures 21, 22, 23, 24:
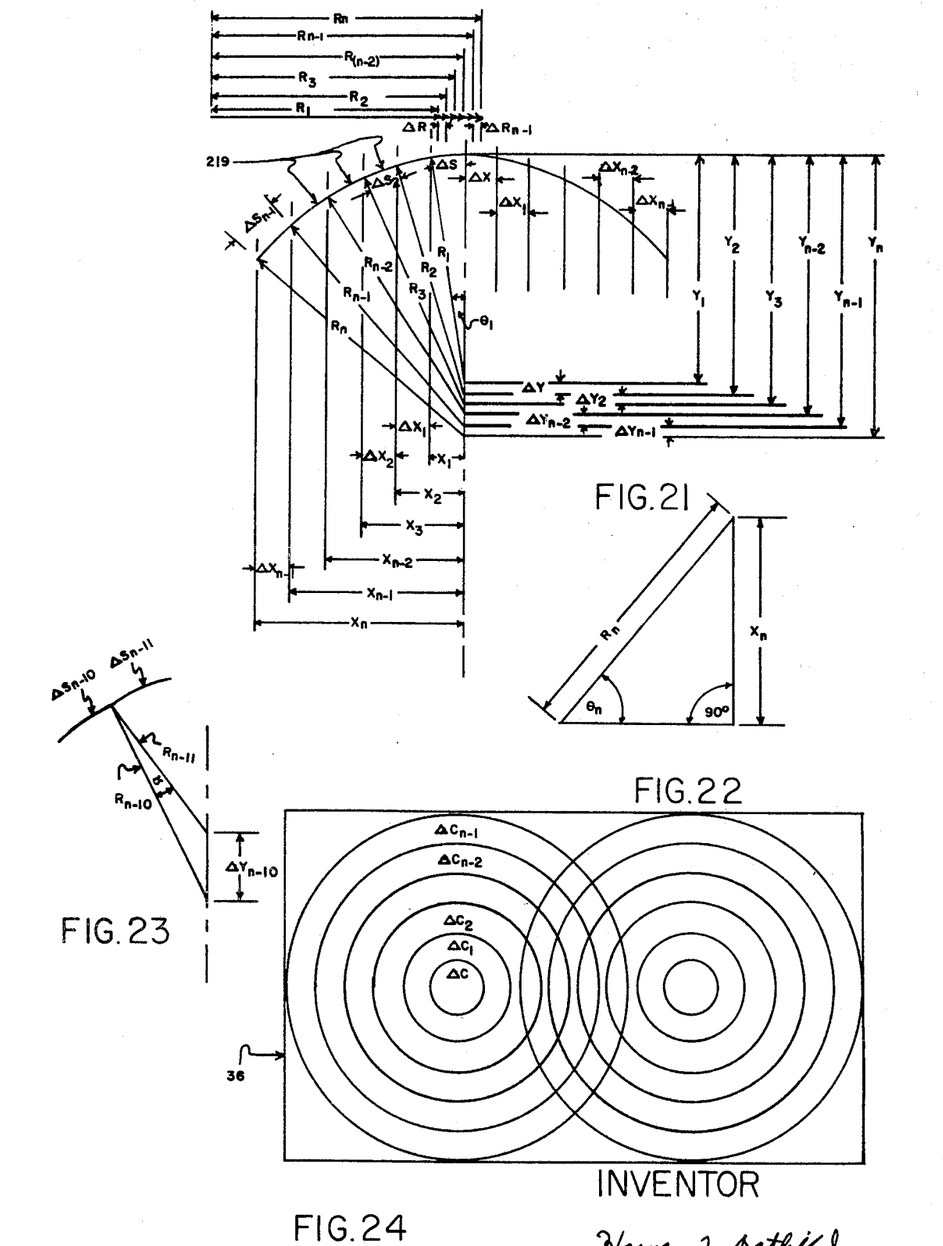

Reference is now made to FIGS. 21 and 22 in order to explain the contemplated aspherical shape of surface 219. Surface 219 is divided into any desirable number ($n$) of spherical elements $\Delta S$, $\Delta S_1$, $\Delta S_2$ ... $\Delta S_{n-2}$, $\Delta S_{n-1}$. FIG. 34 is an enlarged cross section of one form of surface 219. The X dimension of each said spherical element is $\Delta X$, $\Delta X_1$, $\Delta X_2$ ... $\Delta X_{n-2}$, $\Delta X_{n-1}$, respectively. The Y dimension of each said spherical element is $\Delta Y$, $\Delta Y_1$, $\Delta Y_2$ ... $\Delta Y_{n-2}$, $\Delta Y_{n-1}$ respectively. The radius of curvature of each respective spherical element is $R_1$, $R_2$, $R_3$ ... $R_{n-1}$, $R_n$ respectively. The distance below the central point of surface 219 on the axis of surface 219 of the center of curvature of each respective said spherical element is $Y_1$, $Y_2$, $Y_3$ ... $Y_{n-1}$, $Y_n$ respectively. The longest peripheral distances of each said respective spherical element from said axis of said surface 219 are $X_1$, $X_2$, $X_3$ ... $X_{n-1}$, $X_n$ respectively. Obviously $\Delta X = X_1$. The angles at angles at each respective center of curvature between said axis and the corresponding outer peripheral point (or circle) of each respective spherical element, are $\phi_1$, $\phi_2$, $\phi_3$ ... $\phi_{n-1}$, $\phi_n$ respectively (see FIG. 23).

Reference is now made to FIG. 23. It is desirable that each of said spherical elements is of such dimension that any distortion produced upon the eye of a viewing observer because of the junction between any two juxtaposed elements ($\Delta S_{n-11}$ and $\Delta S_{n-10}$, for example having radii of curvature $R_{n-11}$ and $R_{n-10}$ respectively, having $Y_{n-11}$ and $Y_{n-10}$ respectively as the distances below the central point of surface 219 on the axis of said surface 219 to each respective center of curvature, said centers of curvature being $\Delta Y_{n-10}$ apart) is beneath the resolving power of the eye. It is considered that angle $\alpha$ (alpha) should be less than, or in very close proximity to one minute (1′) in order to accomplish this. In the contemplated form of the invention, the following is true:

Condition 1

$$\frac{X_n}{n} = \Delta X = \Delta X_1 = \Delta X_2 \ldots = \Delta X_{n-2} = \Delta X_{n-1}$$

Condition 2

$$\frac{R_n - R_1}{n} = \Delta R = \Delta R_1 = \Delta R_2 \ldots = \Delta R_{n-2} = \Delta R_{n-1}$$

Condition 3

$$\theta_1 = \arcsin \frac{X_1}{R_1}$$

$$\theta_2 = \arcsin \frac{X_2}{R_2}$$

$$\theta_3 = \arcsin \frac{X_3}{R_3}$$

\* \* \* \* \*

$$\theta_{n-1} = \arcsin \frac{X_{n-1}}{R_{n-1}}$$

$$\theta_n = \arcsin \frac{X_n}{R_n}$$

Condition 4

$X_1 = O + \Delta X$
$X_2 = X_1 + \Delta X_1$
$X_3 = X_2 + \Delta X_2$

\* \* \* \* \*

$X_{n-1} = X_{n-2} + \Delta X_{n-2}$
$X_n = X_{n-1} + \Delta X_{n-1}$

Condition 5

$R_1 = 1.30$ inch
$R_2 = R_1 + \Delta R_1$
$R_3 = R_2 + \Delta R_2$

\* \* \* \* \*

$R_{n-1} = R_{n-2} + \Delta R_{n-2}$
$R_n = R_{n-1} + \Delta R_{n-1} = 1.55$ inch Condition 6

$Y_1 = 1.30$
$Y_2 = Y_1 + \Delta Y_1$
$Y_3 = Y_2 + \Delta Y_2$

\* \* \* \* \*

$Y_{n-1} = Y_{n-2} + \Delta Y_{n-2}$
$Y_n = Y_{n-1} + \Delta Y_{n-1}$

\* \* \* \* \*

First resultant of the above conditions since $\alpha$ is very small:

$$\Delta Y_1 = (\Delta R_1) \sec \left( \arcsin \frac{X_1}{R_2} \right)$$

$$\Delta Y_2 = (\Delta R_2) \sec \left( \arcsin \frac{X_2}{R_3} \right)$$

$$\Delta Y_3 = (\Delta R_3) \sec \left( \arcsin \frac{X_3}{R_4} \right)$$

\* \* \* \* \*

$$\Delta Y_{n-2} = (\Delta R_{n-2}) \sec \left( \arcsin \frac{X_{n-2}}{R_{n-1}} \right)$$

$$\Delta Y_{n-1} = (\Delta R_{n-1}) \sec \left( \arcsin \frac{X_{n-1}}{R_n} \right)$$

Since $\Delta Y_{n-1}$ is obviously the largest Y increment in the contemplated form of this invention, $\Delta Y_{n-1}$ when $\alpha = 1$ minute will now be calculated.

$$\Delta Y_{n-1} = \frac{R_n \sin \alpha}{\sin \left( \arcsin \frac{X_n}{R_n} \right)}$$

or $\Delta Y_{n-1} = 0.00059$ inch second resultant therefore $$\Delta R_{n-1} = \frac{\Delta Y_{n-1}}{\sec \left( \arcsin \frac{X_{n-1}}{R_n} \right)}$$

$\Delta R_{-n1} = 0.0003825$ inch (third resultant)

Because of (Condition 2):

$$n = \frac{R_n - R_1}{\Delta R_{n-1}} = \frac{0.25}{0.0003825}$$

$n = 654$ (fourth resultant)

Because of (Condition 1):

$$\Delta X = \frac{X_n}{n} = \frac{1.18}{654}$$

or $\Delta X = 001805$ inch (fifth resultant)

It may now be seen that in the contemplated form of the invention, every R increment is 0.0003825 inch; every X increment is 0.001805 inch and every Y increment is less than 0.00059 inch except $\Delta Y_{n-1}$ which is 0.0059 inch.

It is here pointed out that the conditions could of course have been that all the Y increments are equal to each other, the R increments are equal to each other, and the X increments vary.

In order to more completely explain the function of aspherical surface 219 of lens LE (L or R), the left eye view portion of screen 36 is divided into $n$ imaginary elements or increments $\Delta C, \Delta C_1, \Delta C_2 \ldots \Delta C_{n-2}, \Delta C_{n-1}$ (see FIG. 24). It is emphasized that these elements are *imaginary* for the sake of explanation only. Light rays which leave screen element $\Delta C$ and pass through pupil 217 of the left eye of a viewing observer are rendered almost exactly parallel by spherical element $\Delta S$ of aspherical surface 219. This is true because the focal length of spherical element (for example $\Delta S_{21}$) of a spherical surface 219. As Light rays which leave *any* other element of screen 36 (for example $\Delta C_{21}$) and pass through pupil 217 of the left eye (for example) of a viewing observer are rendered almost exactly parallel by the corresponding spherical element (for example $\Delta S_{21}$) of spherical surface 219. As pointed out before, the distortion caused by the transition from one spherical element to another is considered beneath the resolving power of the eye if $\alpha$ (alpha) is one minute or less.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:

1. A wide-angle viewing device for re-creating originally viewed images, comprising: a housing; a pair of wide-angle oculars supported by said housing in the rear portion thereof with their optical axes spaced apart such as to pass approximately through the centers of the eyes of a normal viewer looking thereinto and making a predetermined and operative angle with respect to each other and with their optical surfaces differently bending blue, green and red light rays entering each of said eyes whereby each of said eyes would normally focus them on different planes with the plane of focus for the blue rays in front, the plane of focus for the green rays in the middle and the plane of focus for the red rays in the rear and with the distance between said planes being a direct function of the angle one of said rays makes with the corresponding one of said optical axes; means supported in the front portion of said housing for generating a pair of images at the respective object planes of said oculars with the respective optical centers of the images optically aligned with the respective optical axes and with sources of red, green and blue light depicting each point of the originally viewed images and causing the distances from the optical centers to be changed such that the red one is displaced nearer than it normally would be, the blue one is displaced farther than it normally would be, and the green one is between the red and blue ones with the difference in the distances between them being a direct function of the distance from each of said optical centers whereby said eyes can focus said blue, green and red light rays on substantially the same plane at their respective retinas.

2. The device of claim 1 wherein said optical surfaces introduce a first type of distortion and said means includes additional means for introducing into said images a second type of distortion predetermined to substantially nullify said first type of distortion.

3. The device of claim 2 wherein each ocular is comprised of a single positive aspherical lens.

4. The device of claim 1 wherein each ocular is comprised of a single positive aspherical lens.

References Cited

UNITED STATES PATENTS

| | | | |
|---|---|---|---|
| 2,388,170 | 10/1945 | McCollum | 178—6.5 |
| 2,906,919 | 9/1959 | Thor | 315—27 |
| 2,931,855 | 4/1960 | Abramson | 178—6.5 |
| 2,955,156 | 10/1960 | Heilig | 178—6.5 |
| 3,051,779 | 8/1962 | Lakjer | 178—6.5 |
| 2,905,754 | 9/1959 | Sziklai | 178—5.4 |
| 3,376,381 | 4/1968 | Ratliff | 178—6.5 |

ROBERT L. GRIFFIN, Primary Examiner

J. A. ORSINO, JR., Assistant Examiner

U.S. Cl. X.R.

178—5.4